United States Patent
Ding et al.

(10) Patent No.: US 10,192,520 B2
(45) Date of Patent: Jan. 29, 2019

(54) BACKLIGHT UNIT, DISPLAY PANEL AND DISPLAY DEVICE

(71) Applicants: Shanghai Tianma Micro-electronics Co., Ltd., Shanghai (CN); Tianma Micro-electronics Co., Ltd., Shenzhen (CN)

(72) Inventors: Yuan Ding, Shanghai (CN); Yongxin He, Shanghai (CN); Guancheng Xiao, Xiamen (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 74 days.

(21) Appl. No.: 15/187,020

(22) Filed: Jun. 20, 2016

(65) Prior Publication Data
US 2017/0263209 A1    Sep. 14, 2017

(30) Foreign Application Priority Data
Mar. 10, 2016  (CN) .......................... 2016 1 0135960

(51) Int. Cl.
G09G 5/10         (2006.01)
(52) U.S. Cl.
CPC ....... *G09G 5/10* (2013.01); *G09G 2300/0452* (2013.01); *G09G 2320/0233* (2013.01);
(Continued)

(58) Field of Classification Search
CPC ... G09G 2300/0452; G09G 2320/0233; G09G 2320/0626; G09G 2320/066; G09G 2330/021; G09G 5/10
See application file for complete search history.

(56) References Cited

U.S. PATENT DOCUMENTS

2006/0007097 A1* 1/2006 Ichikawa .......... G02F 1/133603
                                                345/102
2006/0221636 A1* 10/2006 Ohashi ................ G02B 6/0068
                                                362/612
(Continued)

FOREIGN PATENT DOCUMENTS

CN           1800941 A     7/2006
CN           1896586 A     1/2007
(Continued)

*Primary Examiner* — Afroza Chowdhury
(74) *Attorney, Agent, or Firm* — Anova Law Group, PLLC

(57) ABSTRACT

A backlight unit includes a light source having a plurality of light-emitting units that emit light in at least three different colors, a light guide plate having N preset regions, where N is a positive integer, and a backlight control unit controlling the light-emitting units to provide light to the N preset regions. The light guide plate has a light incidence side, and the light source is disposed opposite to the light incidence side. The light emitted by the light source spreads in the preset regions. The backlight control unit acquires image data information corresponding to the preset regions, and derives chrominance and luminance information of the image corresponding to the preset regions, by calculating the acquired image data information. The backlight control unit then, based on the chrominance and luminance information of the preset regions, controls the light-emitting units to provide light to the preset regions.

18 Claims, 7 Drawing Sheets

(52) U.S. Cl.
CPC ............... *G09G 2320/066* (2013.01); *G09G 2320/0626* (2013.01); *G09G 2330/021* (2013.01)

(56) References Cited

U.S. PATENT DOCUMENTS

| | | | | |
|---|---|---|---|---|
| 2008/0224973 | A1* | 9/2008 | Louwsma | G09G 3/342 345/88 |
| 2009/0295839 | A1* | 12/2009 | Furukawa | G09G 3/3413 345/690 |
| 2012/0120677 | A1* | 5/2012 | Miyairi | G02B 6/0035 362/602 |
| 2013/0120467 | A1* | 5/2013 | Hou | G09G 3/342 345/690 |
| 2013/0314629 | A1* | 11/2013 | Yasui | G02B 27/2264 349/15 |
| 2014/0098563 | A1* | 4/2014 | Kim | G02B 6/0076 362/606 |
| 2015/0198761 | A1* | 7/2015 | Wang | G02B 27/28 353/20 |
| 2016/0247441 | A1* | 8/2016 | Matsueda | G09G 3/2003 |
| 2017/0069243 | A1* | 3/2017 | Guo | G09G 3/2003 |

FOREIGN PATENT DOCUMENTS

| | | |
|---|---|---|
| CN | 202433553 U | 9/2012 |
| CN | 202929236 U | 5/2013 |
| CN | 103854613 A | 6/2014 |
| CN | 204403931 U | 6/2015 |
| CN | 104949009 A | 9/2015 |
| CN | 105278162 A | 1/2016 |
| JP | 5743606 B2 | 7/2015 |
| KR | 20120018255 A | 3/2012 |
| TW | 201303833 A | 1/2013 |

* cited by examiner

BACKLIGHT UNIT, DISPLAY PANEL AND DISPLAY DEVICE

CROSS-REFERENCES TO RELATED APPLICATIONS

This application claims priority of Chinese Patent Application No. 201610135960.8, filed on Mar. 10, 2016, the entire contents of which are hereby incorporated by reference.

FIELD OF THE INVENTION

The present disclosure generally relates to the field of display technologies and, more particularly, relates to a backlight unit, a display panel comprising the backlight unit, and a display device comprising the backlight unit.

BACKGROUND

In a non-self-light-emitting display device, such as a liquid crystal display device, typically a backlight unit provides light for the display device. In an edge-lit backlight unit, light-emitting diodes (LEDs) are often used as a backlight source, i.e., an edge-lit backlight source emitting backlight. Through a light guide plate, the direction of the backlight incident onto a display panel may be changed, and thus the edge-lit backlight source may become a back-lit backlight source facing the display panel. The light emitted from the backlight source transmits through the display panel via an optical film, realizing image display functionality of the display device.

In a backlight unit, LEDs emitting white light are generally used. A plurality of LEDs are connected in series or in parallel, and a stable current is provided to each LED by a respective control unit. In this way, the LEDs may remain in stable brightness, maintaining normal display of various images.

However, due to the difference between images displayed on display panel, the needs of the display panel for various colors of light may change over time. Especially when a display panel displays a monochrome image, pixels that are irrelevant to the color of the displayed image are closed or turned off. However, at this time, the backlight source still provides light to the pixels that are closed, resulting a loss of backlight energy. Therefore, a reasonable allocation of the energy of a backlight source, and further reduction of power consumption of a backlight source, are problems that are need to be urgently addressed in the field of display technologies.

The disclosed methods and structures are directed to solve one or more problems set forth above and other problems in the art.

BRIEF SUMMARY OF THE DISCLOSURE

One aspect of the present disclosure includes a backlight unit. The backlight unit includes a light source having a plurality of light-emitting units that emit light in at least three different colors, a light guide plate having N preset regions, where N is a positive integer and N≥1, and a backlight control unit controlling the light-emitting units to provide light to the preset regions in the light guide plate. The light guide plate has a light incidence side, and the light source is disposed opposite to the light incidence side of the light guide plate. The light emitted by the light source spreads in the preset regions in a convergent way. The backlight control unit acquires image data information corresponding to the N preset regions, and derives chrominance and luminance information of the image corresponding to the preset regions, by calculating the image data information corresponding to the preset regions; and the backlight control unit then, based on the chrominance and luminance information of the preset regions, controls the light-emitting units to provide light to the preset regions.

Another aspect of the present disclosure includes a display panel. The display panel includes a backlight unit and a sub-pixel array. The backlight unit includes a light source having a plurality of light-emitting units that emit light in at least three different colors, a light guide plate having N preset regions, where N is a positive integer and N≥1, and a backlight control unit controlling the light-emitting units to provide light to the preset regions in the light guide plate. The light guide plate has a light incidence side, and the light source is disposed opposite to the light incidence side of the light guide plate. The light emitted by the light source spreads in the preset regions in a convergent way. The backlight control unit acquires image data information corresponding to the N preset regions, and derives chrominance and luminance information of the image corresponding to the preset regions, by calculating the image data information corresponding to the preset regions; and the backlight control unit then, based on the chrominance and luminance information of the preset regions, controls the light-emitting units to provide light to the preset regions.

Another aspect of the present disclosure includes a display device. The display device includes a display panel comprising a backlight unit and a sub-pixel array. The backlight unit includes a light source having a plurality of light-emitting units that emit light in at least three different colors, a light guide plate having N preset regions, where N is a positive integer and N≥1, and a backlight control unit controlling the light-emitting units to provide light to the preset regions in the light guide plate. The light guide plate has a light incidence side, and the light source is disposed opposite to the light incidence side of the light guide plate. The light emitted by the light source spreads in the preset regions in a convergent way. The backlight control unit acquires image data information corresponding to the N preset regions, and derives chrominance and luminance information of the image corresponding to the preset regions, by calculating the image data information corresponding to the preset regions; and the backlight control unit then, based on the chrominance and luminance information of the preset regions, controls the light-emitting units to provide light to the preset regions.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 1:
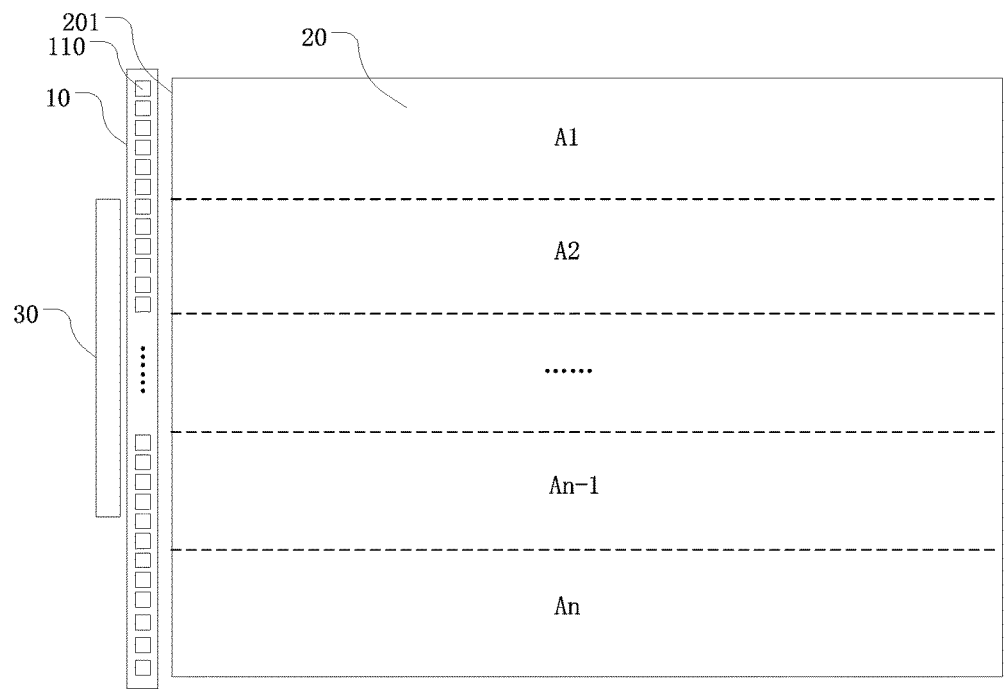
FIG. 1 illustrates a schematic structural view of an exemplary backlight unit consistent with the disclosed embodiments.

FIG. 1 illustrates an exemplary backlight unit. As shown in FIG. 1, the backlight unit comprises a light source 10, a light guide plate 20, and a backlight control unit 30. The light source 10 comprises at least three types of light-emitting units 110 that emit light of different colors. The light guide plate 20 has a light incidence side 201. The light source 10 is disposed opposite to the light incidence side 201 of the light guide plate 20. The light guide plate 20 comprises N preset regions, namely A1, A2, . . . , and An, where N is a positive integer, and N≥1. The light emitted by the light source 10 spreads or prorogates in each preset region in a convergent way, for example, with a stripe pattern.

The backlight control unit 30 acquires image data information corresponding to the preset regions A1, A2, . . . , and An, and derives chrominance and luminance information of the image corresponding to each preset region, by calculating the image data information corresponding to the preset regions. Based on the chrominance and luminance information of each preset region, the backlight control unit 30 controls the light-emitting units 110 to provide light to each preset region.

In the present embodiment, light may spread in a convergent way with a stripe pattern in a preset region of the light guide plate. That is, after light enters the light guide plate, its propagation direction substantially maintains the propagation direction of the light entering the light guide plate, and scatterings toward other directions are substantially small. The convergent spread of the light in the light guide plate may be achieved by optimizing the material of the light guide plate, disposing microstructures on the light guide plate, and other ways. The present invention does not limit the ways of achieving the convergent spread of light in the light guide plate.

Convergent spread of light is helpful for decreasing and even eliminating the mixing of light in different preset regions, and is desired for the backlight control unit to individually control each preset region. Thus, more accurate picture display may be achieved, i.e., images with more accurate colors may be displayed. Meanwhile, the convergent spread of light may increase the propagation distance within the light guide plate, and reduce the power consumption of the backlight unit.

In the present embodiment, a local dimming technique is used in the backlight unit. The local dimming technique is explained in details in following paragraphs. This technique may reduce the energy consumption, enhance the image contrast, and improve the percentage NTSC color gamut of a display panel. Color gamut is the color range of a display panel may reproduce and is usually expressed as a percentage of NTSC. NTSC stands for the National Television System Committee, which developed television standards. A 100% of NTSC refers to the full range of color that may theoretically be displayed on a display panel.

As discussed above, in the present embodiment, the light source of the backlight unit comprises at least three types of light-emitting units that emit different colors, and the light guide plate is divided into N preset regions. The backlight control unit obtains chrominance and luminance information of an image corresponding to each preset region by analysis and calculation. Then, from the obtained luminance and chrominance information, the backlight control unit derives a pulse width modulation (PWM) signal for controlling the light that is emitted from various light-emitting units and enters each preset region. Based on the PWM signal, the backlight control unit controls each light-emitting unit to emit desired light.

Because the PWM signal may modulate the energy required by each light-emitting unit, the energy of the backlight light source may be reasonably allocated or distributed, and thus the overall power consumption of the backlight unit may be reduced. For example, in the chrominance and luminance information of an image corresponding to a preset region, the red component is X1%, the green component is X2%, and the blue component is X3%. The backlight control unit may determine the electric currents that should be provided respectively to red light-emitting unit, a green light-emitting unit, and a blue light-emitting unit, in accordance with the ratio between X1, X2, X3. In this way, unnecessary energy loss may be avoided.

Especially, when a display panel displays a monochrome image, only the light-emitting units providing the corresponding colors in the monochrome image may be provided with an electric current, while the light-emitting units providing other colors may be turned off. In this way, the power consumption of the backlight unit may be greatly reduced. In addition, the convergent spread of light in each preset region may further reduce the energy consumption of the backlight source and, meanwhile, enhance the contrast of a displayed image.

Figure 2:
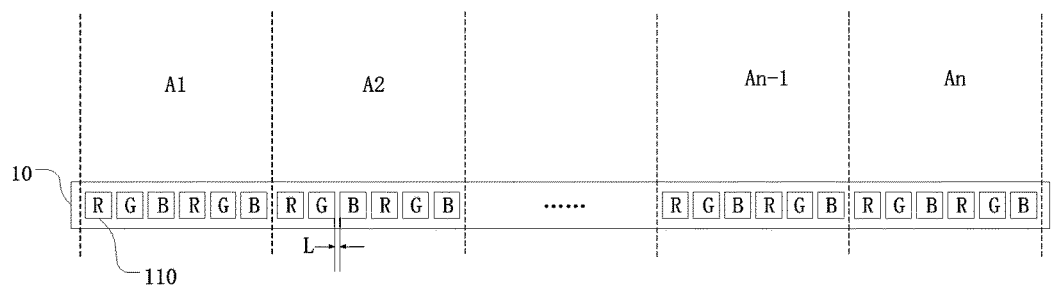
FIG. 2 illustrates a schematic view of an exemplary light source consistent with the disclosed embodiments.

FIG. 2 illustrates an exemplary light source. As shown in FIG. 2, the light source 10 comprises a plurality of light-emitting units 110, which may emit light in a plurality of different colors. In one embodiment, as shown in FIG. 2, the light-emitting units 110 may include a plurality of red light-emitting units R, a plurality of green emitting units G and a plurality of blue light-emitting units B. For the light guide plate with N preset regions A1, A2, . . . , An−1, and An, each preset region may be opposite to a plurality of light-emitting units. That is, each preset region may correspond to a plurality of light-emitting units.

The light-emitting units shown in FIG. 2 are only for illustrative purpose, and are not intended to limit the scope of the present disclosure. The number of the light-emitting units corresponding to each present region may be determined according to various fabrication process and application scenarios. The present invention does not limit the number of light-emitting units corresponding to each present region.

Moreover, the red light-emitting units R, the green light-emitting units G and the blue light-emitting units B may have various arrangements in the light source 10. For example, in FIG. 2, the light-emitting units 110 may have an arrangement of RGBRGBRGB . . . . The light-emitting units 110 may also have other arrangements, such as RBGRBGRBG . . . , and RRBGRRBGRRBG . . . , etc. The arrangement of the light-emitting units 110 may be determined based on various fabrication process and application scenarios. The present invention does not limit the arrangement of the light-emitting units.

It should be noted that, in the present embodiment, in the light-emitting units corresponding to a same preset region, the light-emitting units with a same color may be connected in series to each other. That is, the red light-emitting units R are connected in series to each other, the green light-emitting units G are connected in series to each other, and the blue light-emitting units B are connected in series to each other. The light-emitting units corresponding to different preset regions are independent, thereby avoiding mutual interference between different preset regions.

Further, as shown in FIG. 2, a spacing L between two adjacent light-emitting units 110 may also be determined based on various fabrication process and application scenario. In one embodiment, the spacing L between two adjacent light-emitting units 110 may be approximately in the range of 0.01 mm-4 mm. It is experimentally verified that when the spacing L between two light-emitting units is in the range of 0.01 mm-4 mm, after the light emitted from the light-emitting units corresponding to a preset region enters into the corresponding preset region, the light may be uniformly mixed to provide a better display effect. In particular, when the spacing L between two light-emitting units is in the range of 0.3 mm-1.5 mm, the light emitted from the light-emitting units may present a best mixed state in the corresponding preset region, and thus an excellent display effect may be achieved.

When the spacing L between two light-emitting units is larger than 4 mm, because the spacing between two light-emitting units is too large, while in the present embodiment, the light spreads in the light guide plate in a convergent way, the light emitted from the light-emitting units may not be uniformly mixed in the preset region. Thus, the light-emitting units may not provide the preset region with the light required by the chrominance and luminance information of an image corresponding to the preset region.

Referring to FIG. 2, in one embodiment, the light-emitting units 110 may be light-emitting diode chips. That is, the light-emitting units R, G, B may be respectively a red light-emitting diode chip, a green light-emitting diode chip and a blue light-emitting diode chip. Each light-emitting diode chip may have a size in the range of 100 um-300 um. Because the light-emitting diode chip has small size, a plurality of light-emitting diode chips may be disposed corresponding to a preset region of the light guide plate. Thus, the light entering a preset region may have a uniform distribution, and accurate image display may be achieved accordingly. That is, by using the light-emitting diode chips with an overall length dimension in the range of 100 um-300 um, desired display effects may be achieved.

In another embodiment, the light-emitting unit 110 may be a nanowire light-emitting diode unit. That is, the light-emitting units R, G, B may be respectively a nanowire red light-emitting diode unit, a nanowire green light-emitting diode unit, and a nanowire blue light-emitting diode unit. Each light-emitting diode unit may have a size in the range of 5 um-30 um.

A nanowire light-emitting diode unit may be an array of nanoscale light-emitting diodes formed on a substrate. The substrate may be a silicon wafer or other material, and the present invention does not limit the material of the substrate. After being formed on a substrate, the nanowire light-emitting diode array is then transferred to a place of a light source, and works as a light-emitting unit. The size of a nanowire light-emitting diode unit is substantially small. When a nanowire light-emitting diode unit works as a light-emitting unit, a plurality of nanowire light-emitting diode units may be disposed corresponding to a preset region of the light guide plate. Thus, the light entering a preset region may have a uniform distribution, and accurate image display may be achieved accordingly.

In another embodiment, the light-emitting unit 110 may be a quantum-dot (QD) light-emitting diode unit. That is, in FIG. 2, light-emitting units R, G, B may be respectively a quantum-dot red light-emitting diode unit, a quantum-dot green light-emitting diode unit, and a quantum-dot blue light-emitting diode unit. Because the light-emitting material of a quantum-dot light-emitting diode unit is a nanocrystal, the size of a quantum-dot light-emitting diode unit may be at a nanometer scale. When a quantum-dot light-emitting diode unit works as the light-emitting unit, a plurality of quantum-dot light-emitting diode units may be disposed corresponding to a preset region of the light guide plate. Thus, the light entering a preset region may have a uniform distribution, and accurate image display may be achieved accordingly.

Figure 3:
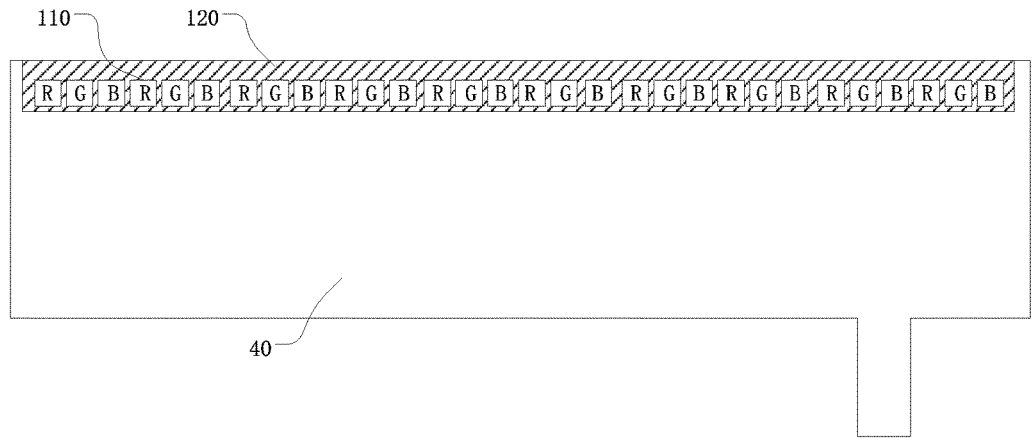
FIG. 3 illustrates a schematic structural view of an exemplary printed circuit board consistent with the disclosed embodiments.

In the present embodiment, the backlight unit may further comprise a printed circuit board. FIG. 3 illustrates an exemplary printed circuit board. As shown in FIG. 3, the light-emitting units 110 are integrated on a printed circuit board 40, and are wholly packaged with a packaging material 120. The packaging material 120 may be a transparent material, for example, may be a transparent layer formed with silicone, silicone gel, and epoxy resin, etc. The present invention does not limit the material type of the packaging material 120.

Further, the refractive indexes of the packaging material 120 and the light guide plate 20 may be selected according to various requirements of the backlight unit, for example, power consumption, light distribution uniformity, etc. In one embodiment, when the refractive index of the packaging material 120 is n1, and the refractive index of the light guide plate 20 is n2, the refractive indexes of the packaging material 120 and the light guide plate 20 may be selected as $-5\% \leq (n1-n2)/n2 \leq 5\%$. That is, the refractive index of the packaging material 120 may be equal to or approximately equal to the refractive index of the light guide plate 20.

Figure 4:
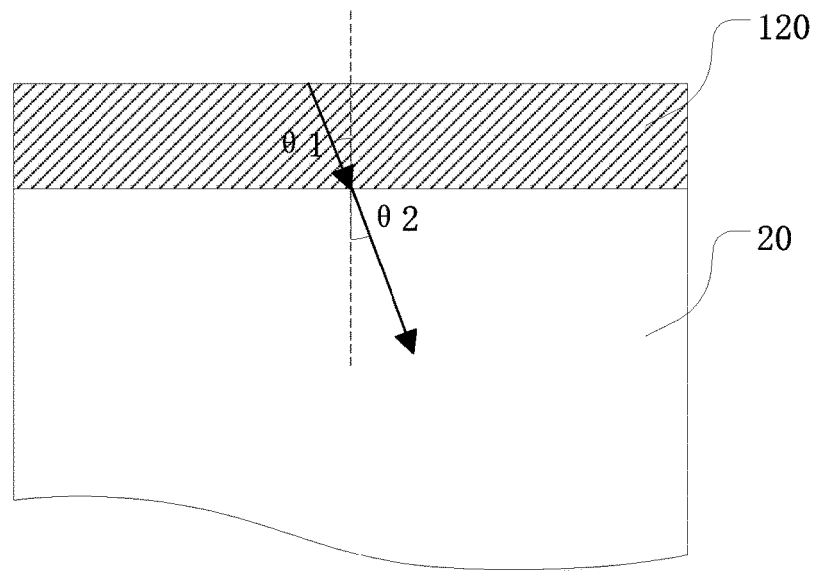
FIG. 4 illustrates a schematic optical path of light entering an exemplary light guide plate, consistent with the disclosed embodiments.

FIG. 4 illustrates an optical path of light entering an exemplary light guide plate, wherein arrows show the light propagation directions, $\theta 1$ is the incident angle, and $\theta 2$ is the refraction angle. When the refractive index n1 of the light guide plate 20 is equal to or approximately equal to the refractive index n2 of the packaging material 120, according to the formula of refractive index (i.e., Snell's Law), $n1/n2=\sin θ2/\sin θ1$, the incident angle $θ1$ is equal to or approximately equal to the refraction angle $θ2$. That is, after the light enters the light guide plate 20 through penetrating the packaging material 120, its propagation direction may not change significantly.

Thus, when the light emitted from the light-emitting unit enters the light guide plate 20 through penetrating the packaging material 20, the total internal reflection at the interface between the light-receiving surface of the light guide plate 20 and the packaging material 120 may be reduced, and even eliminated. In this way, most light emitted from the light-emitting unit may enter the light guide plate, reducing the light loss.

Figure 5:
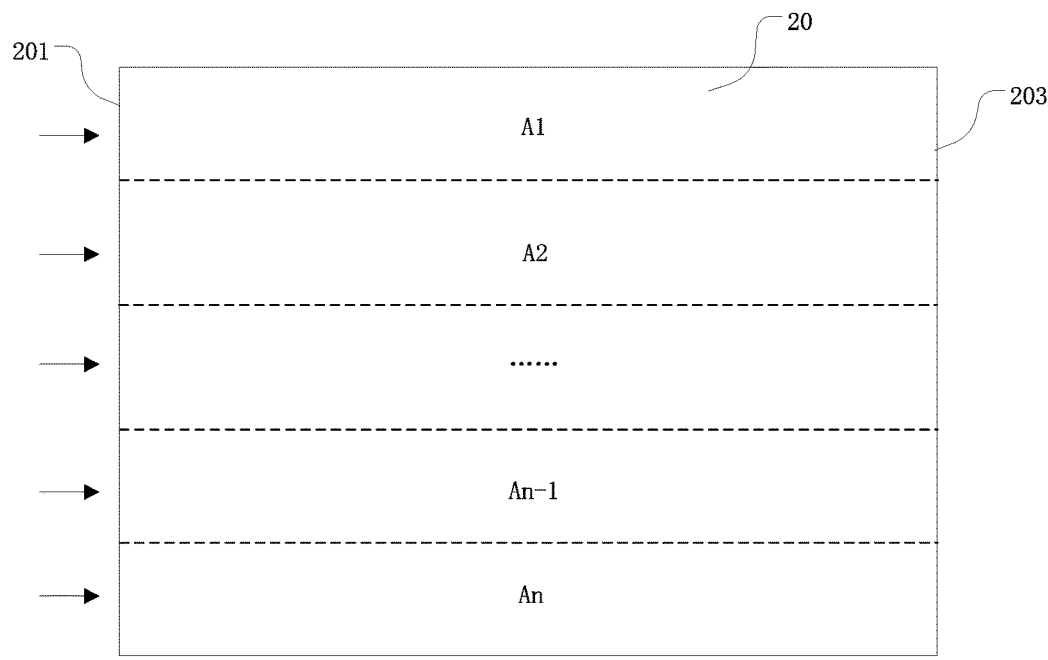
FIG. 5 illustrates a schematic view of an exemplary light guide plate consistent with the disclosed embodiments.

FIG. 5 illustrates an exemplary light guide plate. As shown in FIG. 5, the light guide plate 20 comprises a first light incidence side 201, a second side surface 203 arranged opposite to the first light incidence side 201, and N preset regions of the light guide plate, numbered as A1, A2, . . . , An−1, and An. Each of the N preset regions extends from the first light incidence side 201 to the second side surface 203. The light emitted from the light-emitting units enters the N preset regions A1, A2, . . . , An−1, and An, from the first light incidence side 201. In FIG. 5, arrows schematically show the directions of the light entering the first light incidence side 201.

Figure 6:
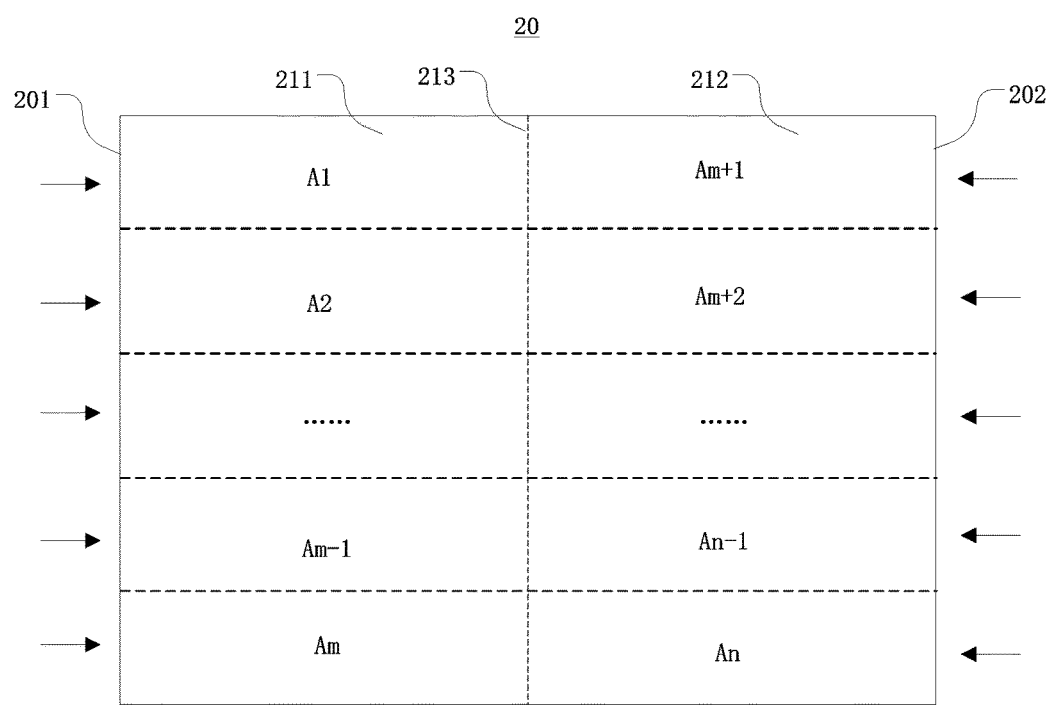
FIG. 6 illustrates a schematic view of another exemplary light guide plate consistent with the disclosed embodiments.

Further, the light guide plate may also have a second light incidence side. FIG. 6 illustrates another exemplary light guide plate. As shown in FIG. 6, the light guide plate 20 comprises a first light incidence side 201, a second light incidence side 202 disposed opposite to the first light incidence side 201, and N preset regions including a first preset area 211 and a second preset area 212. The first preset area 211 refers to the group of preset regions extending from the first light incidence side 201 into the light guide plate 20. The second preset area 212 refers to the group of preset regions extending from the second light incidence side 202 into the light guide plate 20. The first preset area 211 comprises preset regions A1, A2, . . . , and Am, and the second preset area 212 comprises preset regions Am+1, . . . , An, where m and n are positive integers, and 1≤m≤N.

As shown in FIG. 6, the light emitted from the light-emitting units enters the first preset area 211 from the first light incidence side 201, and the light emitted from the light-emitting units enters the second preset area 212 from the second light incidence side 202. The arrows in FIG. 6 show the directions of the light entering the first light incidence side 201 and the second light incidence side 202, respectively.

In one embodiment, as shown in FIG. 6, each preset region in the first preset area 211 extends from the first light incidence side 201 to the middle of the light guide plate 20, and each preset region in second preset area 212 extends from the second light incidence side 202 to the middle of the light guide plate 20. A dotted line 213 shows the middle of the light guide plate 20. That is, the light-emitting units facing the first light incidence side 201 of the light guide plate provide light to the first preset area 211, and the light-emitting units facing the second light incidence side 202 of the light guide plate provide light to the second preset area 212. Each preset region in the first present area 211 and the second preset area 212 has a uniform light distribution. In this way, the loss of light due to long distance propagation may be avoided, and thus better display effect may be achieved.

In addition, because the light guide plate may comprise more preset regions, light guide distances in the preset regions may be reduced, and thus the design difficulty of the light guide plate may be decreased. The disclosed light guide plate may be suitable for large-scale liquid crystal display modules.

Further, as shown in FIG. 1, the backlight unit comprises a backlight control unit 30. The backlight control unit 30 comprises an image information receiving module, an image information analysis module, and a light-emitting unit control module. These modules may work together in realizing the control over the N preset regions of the light guide plate.

Figure 7:
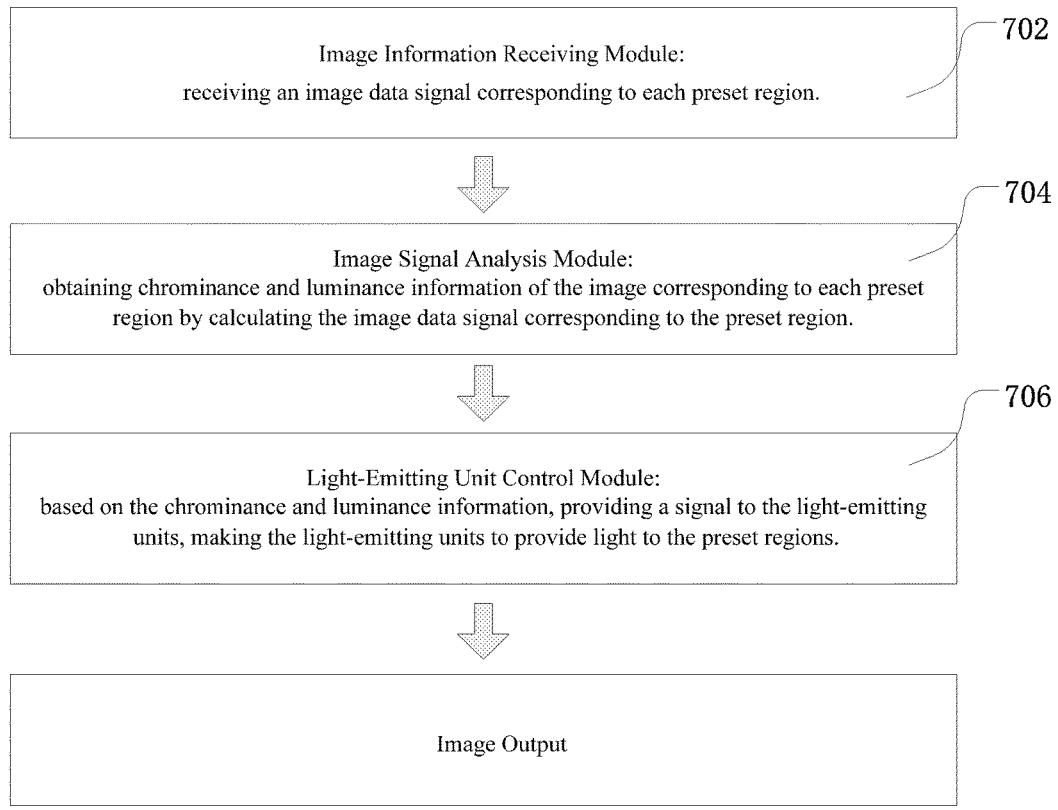
FIG. 7 illustrates functional relationships of modules of an exemplary backlight control unit consistent with the disclosed embodiments.

FIG. 7 illustrates functional relationships of the modules of an exemplary backlight control unit. As shown in FIG. 7, the backlight control unit may comprise an image information receiving module 702, an image signal analysis module 704, and a light-emitting unit control module 706. The image information receiving module 702 may be configured to receive an image data signal corresponding to each preset region, and the image data signal is transmitted to the backlight unit by a relevant integrated circuit in the display panel. The image signal analysis module 704 may be configured to obtain chrominance and luminance information of the image corresponding to each preset region by calculating the image data signal corresponding to the preset region. The chrominance and luminance information comprises share components of red, green and blue and other colors in the image corresponding to each preset area, and the luminance information of these colors.

Various algorithms may be used by the image signal analysis module. For example, the image signal analysis module 704 may count all the red color information (such as gray scale, brightness, voltage, current, etc.) of a whole image. With statistical operations, the image signal analysis module 704 may obtain chrominance and luminance information of red color. The statistical operations may use, for example, the average value, median value, value with a maximum count of a same information, mean value of the maximum and the minimum, etc. The chrominance and luminance information of other colors, such as green and blue, may be obtained in a similar way. Other similar algorithms are also within the scope of the present disclosure.

After obtaining the chrominance and luminance information of the image corresponding to each preset region, the light-emitting unit control module 706 may be configured to obtain a PWM signal, which may control the light emitted by each light-emitting unit and entering each preset region, based on the chrominance and luminance information. Based on the PWM signal, the light-emitting unit control module may be configured to control the light-emitting units to emit the required light.

For example, in the chrominance and luminance information of an image corresponding to a preset region, the red component is X1%, the green component is X2%, and the blue component is X3%. According to the ratio between X1, X2, and X3, the backlight control unit may obtain a PWM signal that controls the light emitted by the red light-emitting units, the green light-emitting units, and the blue light-emitting units. Further, based on the PWM signal, the backlight control unit may determine the electric currents that are provided respectively to a red light-emitting unit, a green light-emitting unit, and a blue light-emitting unit. In this way, unnecessary energy loss of the light-emitting units may be avoided.

Figure 8:
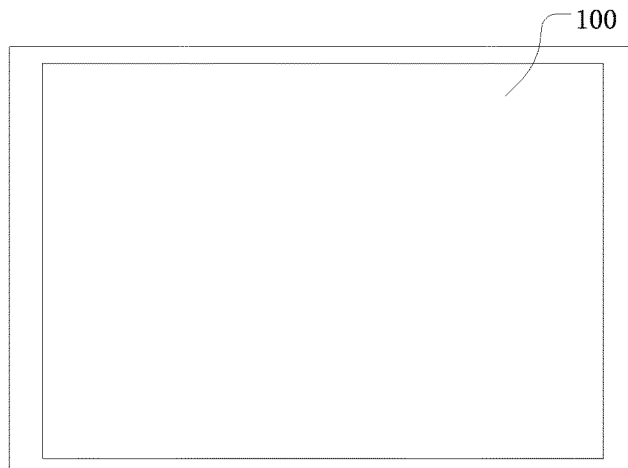
FIG. 8 illustrates a schematic view of an exemplary display panel consistent with the disclosed embodiments.

FIG. 8 illustrates an exemplary display panel, wherein the display panel 100 comprises a backlight unit with any one of the exemplary configurations of the above embodiment. The display panel 100 may be any appropriate type of display panels capable of displaying videos and/or images, such as plasma display panel (PDP), field emission display (FED) panel, liquid crystal display (LCD) panel, organic light-emitting diode (OLED) display panel, light-emitting diode (LED) display panel, quantum dots (QDs) display panel, electrophoretic display panels (i.e., e-readers) or other types of display panels.

Figure 9:
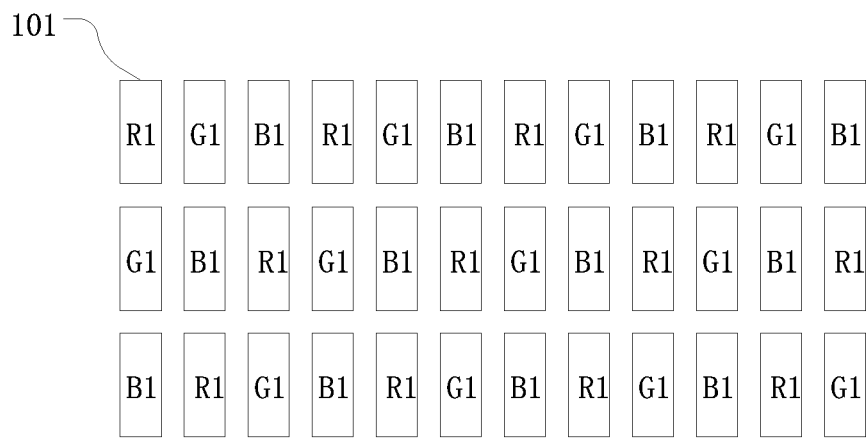
FIG. 9 illustrates a schematic view of an exemplary sub-pixel array consistent with the disclosed embodiments.

In addition, as shown in FIG. 9, the display panel 100 may include a sub-pixel array, comprising sub-pixels arranged in an array. FIG. 9 illustrates an exemplary array of sub-pixels, wherein sub-pixels 101 may comprise three types of sub-pixels, namely red sub-pixels R1, green sub-pixels G1, and blue sub-pixels B1. The red sub-pixels R1, green sub-pixels G1, and blue sub-pixels B1 may be arranged in an array in a staggered and repeated way.

Figure 10:
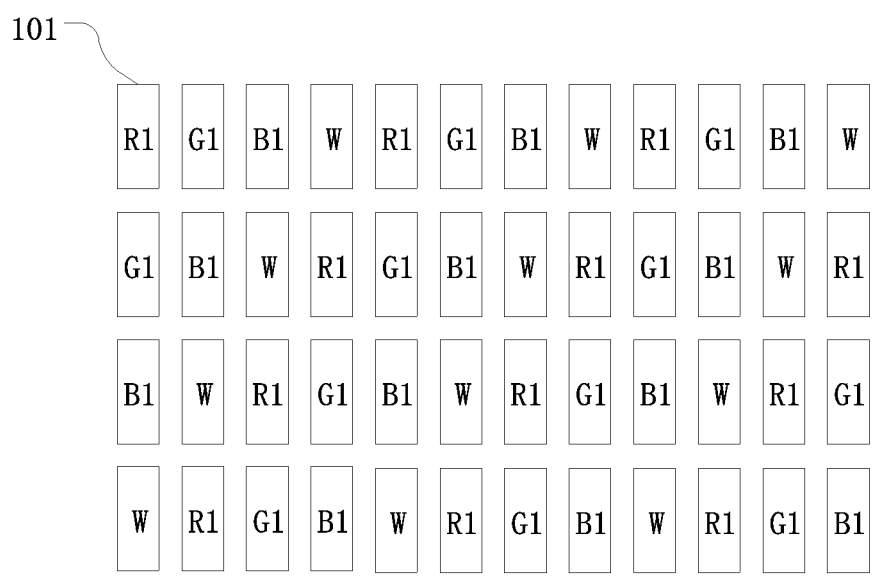
FIG. 10 illustrates a schematic view of another exemplary sub-pixel array consistent with the disclosed embodiments.

In certain embodiments, the sub-pixel array may further comprise white sub-pixels. FIG. 10 illustrates another exemplary array of sub-pixels, wherein sub-pixels 101 may comprise four types of sub-pixels, namely red sub-pixels R1, green sub-pixels G1, blue sub-pixels B1, and white sub-pixels W. The red sub-pixels R1, green sub-pixels G1, blue sub-pixels B1, and white sub-pixels W may be arranged in an array in a staggered and repeated way.

Figure 11:
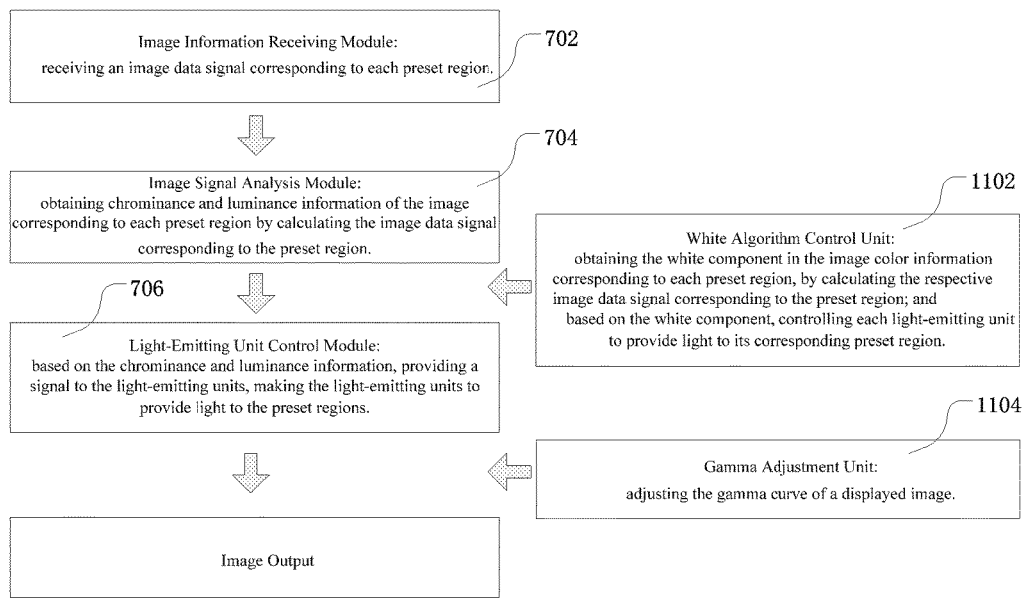
FIG. 11 illustrates functional relationships of a control unit of an exemplary display panel, consistent with the disclosed embodiments.

FIG. 11 illustrates an exemplary control unit of a display panel. As shown in FIG. 11, when the sub-pixel array of a display panel comprises white sub-pixels, the display panel may further comprise a white algorithm control unit 1102. The white algorithm control unit 1102 obtains the white component in the image color information corresponding to each preset region, by calculating the respective image data signal corresponding to the preset region. Based on the white component, the white algorithm control unit further derives a PWM signal that controls the light emitted by each light-emitting unit, and thus controls each light-emitting unit to provide light to each preset region.

Further, as shown in FIG. 11, both a display panel comprising three types of sub-pixels R1, G1 and B1, and a display panel comprising four types of sub-pixels R1, G1, B1 and W, may further comprise a gamma adjustment unit 1104. The gamma adjustment unit 1104 may adjust the gamma curve of an image displayed on the display panel, so as to eliminate image distortion and enable accurate images to be displayed.

In another embodiment, the sub-pixel array in the present embodiment may be a rainbow sub-pixel array, wherein the rainbow sub-pixel array refers to an array of seven types of sub-pixels that have seven rainbow colors, respectively.

Figure 12:
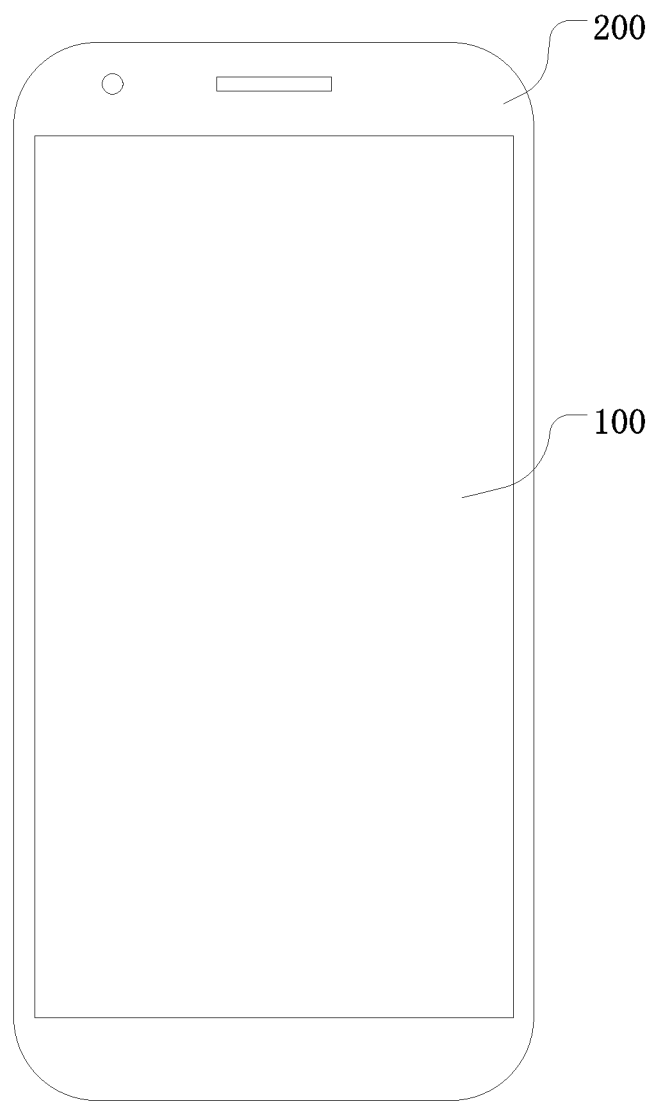
FIG. 12 illustrates a schematic view of an exemplary display device consistent with the disclosed embodiments.

FIG. 12 illustrates an exemplary display device, wherein the exemplary display device 200 may comprise a display panel 100 with any one of the exemplary configurations of the above embodiment. For example, the display device 200 may be a tablet, a TV, a smartphone, a notebook, and a smartwatch including any of the disclosed display panel, etc. Although a smartphone is shown in FIG. 12, the display device 200 may be any appropriate type of content-presentation devices including any of the disclosed display panel. Because the disclosed display device 200 includes the disclosed display panel, the disclosed display device may also exhibit same advantages as the disclosed display panel.

The present invention provides a backlight unit, a display panel and a display device. A light source for the backlight unit comprises at least three types of light-emitting units emitting light in different colors, such as red light-emitting units, green light-emitting units, and blue light-emitting units. A light-emitting unit may be a light-emitting unit having a micrometer scale or even a nanometer scale, such as a light-emitting diode chip, a nanowire light-emitting diode unit, and a quantum-dot light-emitting diode unit, and the like. Due to small sizes, a plurality of light-emitting units may be disposed opposite to a preset region of a light guide plate. In this way, the light entering a preset region may have a uniform distribution, and more accurate picture display may be achieved.

Meanwhile, in the disclosed embodiments of the present invention, light spreads in a light guide plate in a convergent way, avoiding the light mixing between preset regions, and improving the display contrast. Further, a backlight control unit may independently control each preset region. A backlight control unit may analyze and calculate the image chrominance and luminance information corresponding to each preset region, and derives a PWM signal controlling a variety of light-emitting units that emit lights entering each present region. Based on the PWM signal, the backlight control unit then controls the light-emitting units to emit the required light.

As a PWM signal may modulate the energy required by each light-emitting unit, the energy of a backlight source may be reasonably allocated, thereby reducing the overall power consumption of the backlight unit. Especially when a display panel displays a monochrome image, only the corresponding light-emitting units providing the display color need to be provided with an electric current, while the light-emitting units providing other colors may be turned off. In this way, the power consumption of the backlight unit may be greatly reduced.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A backlight unit, comprising:
    a light source having a plurality of light-emitting units that emit light in at least three different colors;
    only one light guide plate having N preset regions, where N is a positive integer, and N>1; and
    a backlight control unit controlling the light-emitting units to provide light to the preset regions in the only one light guide plate,
    wherein:
    the only one light guide plate has a light incidence side and a side surface opposite to the light incidence side, and the N preset regions continuously extend from the light incidence side to the side surface of the only one light guide plate;
    all light-emitting units in the light source are disposed at the light incidence side of the only one light guide plate, and the light emitted from the plurality of light-emitting units enters the N preset regions from the light incidence side of the only one light guide plate;
    in the light-emitting units corresponding to a same preset region in the N present regions, the light-emitting units with a same color are connected in series;
    the light-emitting units corresponding to different preset regions in the N present regions are independent;
    the light emitted by the light source spreads in the preset regions in a convergent way;
    the backlight control unit acquires image data information corresponding to the N preset regions, and derives chrominance and luminance information of an image corresponding to each preset region, by calculating the image data information corresponding to each preset region, wherein the chrominance and luminance information of the image corresponding to each present region comprises a ratio of a red component, a green component and a blue component; and the backlight control unit then, based on the chrominance and luminance information of each preset region, determines an electric current for each red light-emitting unit, each green light-emitting unit and each blue light-emitting unit of each preset region, according to the ratio of the red component, the green component and the blue component.

2. The backlight unit according to claim 1, wherein the light-emitting units comprise red light-emitting units, green light-emitting units, and blue light-emitting units.

3. The backlight unit according to claim 1, wherein the light emitted by the light source and spreading in the present regions in the convergent way has a stripe pattern.

4. The backlight unit according to claim 1, wherein a light-emitting unit of the plurality of light-emitting units is a light-emitting diode chip, and the light-emitting diode chip has a size approximately 100 um-300 um.

5. The backlight unit according to claim 1, wherein a light-emitting unit of the plurality of light-emitting units is a nanowire light-emitting diode unit, and the nanowire light-emitting diode unit has a size approximately 5 um-30 um.

6. The backlight unit according to claim 1, wherein a light-emitting unit of the plurality of light-emitting units is a quantum-dot light-emitting diode unit.

7. The backlight unit according to claim 1, further comprising a printed circuit board, wherein the light-emitting units are integrated on the printed circuit board, and are packaged with a packaging material.

8. The backlight unit according to claim 7, wherein the packaging material is a transparent material, a refractive index of the packaging material is n1, a refractive index of the light guide plate is n2, and $-5\% \le (n1-n2)/n2 \le 5\%$.

9. The backlight unit according to claim 1, wherein a spacing between two adjacent light-emitting units is approximately 0.01 mm-4 mm.

10. The backlight unit according to claim 1, wherein the backlight control unit further comprises an image information receiving module, an image information analysis module, and a light-emitting unit control module, wherein:
the image information receiving module receives an image data signal corresponding to each preset region;
the image signal analysis module obtains chrominance and luminance information of the image corresponding to each preset region by calculating the image data signal corresponding to the preset region; and
the light-emitting unit control module, based on the chrominance and luminance information, provides a signal to the light-emitting units, making the light-emitting units to provide light to the preset regions.

11. A display panel, comprising a backlight unit and a sub-pixel array, wherein the backlight unit comprises a light source having a plurality of light-emitting units that emit light in at least three different colors, only one light guide plate having N preset regions, where N is a positive integer and N>1, and a backlight control unit controlling the light-emitting units to provide light to the preset regions in the only one light guide plate;
wherein:
the only one light guide plate has a light incidence side and a side surface opposite to the light incidence side, and the N preset regions continuously extend from the light incidence side to the side surface of the only one light guide plate;
all light-emitting units in the light source are disposed at the light incidence side of the only one light guide plate, and the light emitted from the plurality of light-emitting units enters the N preset regions from the light incidence side of the only one light guide plate;
in the light-emitting units corresponding to a same preset region in the N present regions, the light-emitting units with a same color are connected in series;
the light-emitting units corresponding to different preset regions in the N present regions are independent;
the light emitted by the light source spreads in the preset regions in a convergent way;
the backlight control unit acquires image data information corresponding to the N preset regions, and derives chrominance and luminance information of an image corresponding to each preset region, by calculating the image data information corresponding to each preset region, wherein the chrominance and luminance information of the image corresponding to each present region comprises a ratio of a red component, a green component and a blue component; and
the backlight control unit then, based on the chrominance and luminance information of each preset region, determines an electric current for each red light-emitting unit, each green light-emitting unit and each blue light-emitting unit of each preset region, according to the ratio of the red component, the green component and the blue component.

12. The display panel according to claim 11, wherein the sub-pixel array comprises three types of sub-pixels including red sub-pixels, green sub-pixels, and blue sub-pixels, and these sub-pixels are arranged in an array.

13. The display panel according to claim 12, wherein the sub-pixel array further comprises white sub-pixels.

14. The display panel according to claim 11, further comprising a white algorithm control unit, wherein:
the white algorithm control unit obtains the white component in the image color information corresponding to each preset region, by calculating the respective image data signal corresponding to the preset region; and
based on the white component, the white algorithm control unit controls each light-emitting unit to provide light to its corresponding preset region.

15. The display panel according to claim 11, wherein the sub-pixel array is a rainbow sub-pixel array, and the rainbow sub-pixel array refers to an array of seven types of sub-pixels that have seven rainbow colors, respectively.

16. The display panel according to claims 11, further comprising a gamma adjustment unit, wherein the gamma adjustment unit adjusts the gamma curve of an image displayed on the display panel.

17. A display device, comprising a display panel including a backlight unit and a sub-pixel array, wherein the backlight unit comprises a light source having a plurality of light-emitting units that emit light in at least three different colors, only one light guide plate having N preset regions, where N is a positive integer and N>1, and a backlight control unit controlling the light-emitting units to provide light to the preset regions in the only one light guide plate;
wherein:
the only one light guide plate has a light incidence side and a side surface opposite to the light incidence side, and the N preset regions continuously extend from the light incidence side to the side surface of the only one light guide plate;

all light-emitting units in the light source are disposed at the light incidence side of the only one light guide plate, and the light emitted from the plurality of light-emitting units enters the N preset regions from the light incidence side of the only one light guide plate;

in the light-emitting units corresponding to a same preset region in the N present regions, the light-emitting units with a same color are connected in series;

the light-emitting units corresponding to different preset regions in the N present regions are independent;

the light emitted by the light source spreads in the preset regions in a convergent way;

the backlight control unit acquires image data information corresponding to the N preset regions, and derives chrominance and luminance information of an image corresponding to each preset region, by calculating the image data information corresponding to each preset region, wherein the chrominance and luminance information of the image corresponding to each present region comprises a ratio of a red component, a green component and a blue component; and the backlight control unit then, based on the chrominance and luminance information of each preset region, determines an electric current for each red light-emitting unit, each green light-emitting unit and each blue light-emitting unit of each preset region, according to the ratio of the red component, the green component and the blue component.

18. A backlight unit, comprising:

a light source having a plurality of wholly packaged light-emitting units that emit light in at least three different colors;

a light guide plate independent of the plurality of wholly packaged light-emitting units and having N preset regions, where N is a positive integer, and N>1; and a backlight control unit controlling the light-emitting units to provide light to the preset regions in the light guide plate, wherein:

each of the N preset regions corresponds to at least three light-emitting units, wherein the at least three light-emitting units are emitting light in the at least three different colors and individually controlled by the backlight control unit;

the light guide plate has a light incidence side, and the light source is disposed opposite to the light incidence side of the light guide plate;

the light emitted by the light source spreads in the preset regions in a convergent way;

the light emitted by the light source and spreading in the preset regions in the convergent way has a stripe pattern; and the backlight control unit acquires image data information corresponding to the N preset regions, and derives chrominance and luminance information of an image corresponding to each preset region, by calculating the image data information corresponding to each preset region, wherein the chrominance and luminance information of the image corresponding to each present region comprises a ratio of a red component, a green component and a blue component; and the backlight control unit then, based on the chrominance and luminance information of each preset region, determines an electric current for each red light-emitting unit, each green light-emitting unit and each blue light-emitting unit of each preset region, according to the ratio of the red component, the green component and the blue component.

* * * * *